June 24, 1958 J. K. DOUGLAS 2,840,045
CONTROL FOR HYDRODYNAMIC MACHINES
Filed Aug. 8, 1956 2 Sheets-Sheet 1

INVENTOR
JAMES K. DOUGLAS
BY
ATTORNEY

United States Patent Office 2,840,045
Patented June 24, 1958

2,840,045

CONTROL FOR HYDRODYNAMIC MACHINES

James K. Douglas, Shorewood, Wis., assignor to The Oilgear Company, Milwaukee, Wis., a corporation of Wisconsin Application August 8, 1956, Serial No. 602,787

3 Claims. (Cl. 121—41)

This invention relates to controls for varying the displacements of pumps and hydraulic motors and relates in particular to a control for a pump or motor of the type having a displacement varying member which is shiftable between a zero displacement position and a maximum displacement position but is restrained from movement in any other direction. Since the function of a motor is substantially opposite to that of a pump, the invention will be explained as being embodied in a control for a pump in order to simplify the explanation but the same control can be used on a motor.

The type of control to which the invention relates in particular includes a stationary cylinder, a piston which engages the displacement varying member and is fitted in the cylinder by means of a piston ring, and a valve which controls the flow of liquid into and out of the cylinder and is closely fitted in the piston and in the end head of the cylinder.

The displacement varying member is restrained as much as possible from moving vertically or axially but, since the member must be free to move transversely of the pump axis in a horizontal plane, the restraining means cannot be preloaded. Consequently, when the pump creates a high pressure, the resultant forces in the pump cause the member to move vertically and/or axially or to tilt and those movements are transmitted to the control piston even when an anti-friction bearing is arranged between the piston and the member. The movements transmitted to the piston may not be much more than .001" but they are sufficient to cramp the valve so that an objectionably large force is required to move it. Such a valve is very often operated by a hydraulic or electric actuator which is controlled from a remote point. The actuator is capable of exerting a force considerably greater than the force required to move the valve under normal conditions but, when the valve is cramped or binds in the valve body, the force required to move it is sometimes far beyond the capacity of the actuator unless an objectionably large actuator is employed.

The present invention has as its object to provide a control of the above type in which cramping or binding of the valve is avoided so that the control may be easily and accurately adjusted.

A control constructed according to the invention has an advantage in that the operability and accuracy of the control is not affected by slight manufacturing errors as is the case in the prior controls of this type.

Other objects and advantages will appear from the following description of the embodiment of the invention shown in part schematically in the accompanying drawings in which the views are as follows.

Figure 5:
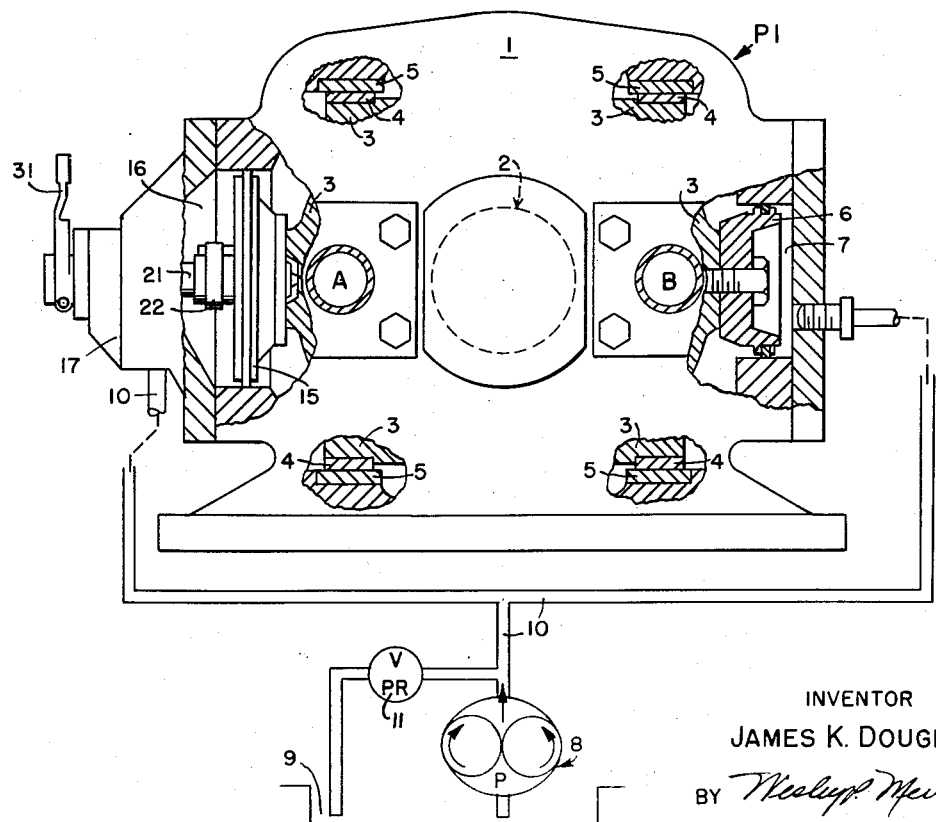
Fig. 5 is in part an end view partly in section of a pump to which a control embodying the invention has been applied and in part a diagram of the hydraulic circuit which supplies liquid for operating the control, the view being on a smaller scale than the other views.

The pump P1 shown in Fig. 5 is a well known type which has been in extensive commercial use for many years. It is deemed sufficient to state herein that the pump has its mechanism arranged within and supported by a case 1 having two ports A and B by means of which it may be connected to an external circuit; that the pump mechanism includes a central valve shaft or pintle 2 which is rigidly secured in one end wall of case 1, a cylinder barrel (not shown) which contains the pumping pistons and cylinders and is journaled upon pintle 2, and a displacement varying member or slide block 3 which is slideable transversely of pintle 2 but is restrained from movement in any other direction; and that pump P1 will discharge liquid in a direction and at a rate determined by the direction and distance the axis of slide block 3 is offset from the axis of pintle 2, pump displacement being zero when the axis of slide block 3 is coincident with the axis of pintle 2 and being maximum when the axis of slide block 3 is offset the greatest distance from the axis of pintle 2.

Slide block 3 is sometimes mounted between roller bearings but has been shown provided at each of its corners with a slide plate 4 which engages a bearing plate 5 fixed to case 1. Somewhat similar means (not shown) are provided to prevent movement of slide block 3 axially of pintle 2. Slide block 3 with the slide plates thereon is fitted between the bearing plates as closely as is possible and still permit it to be moved transversely of pintle 2.

In a pump provided with a control of the type in which the invention is embodied, the slide block 3 thereof is continuously urged toward the left by a substantially constant force which in some instances is provided by a spring or springs and in other instances is provided as shown by a piston 6 which is fitted in a cylinder 7 carried by the right side wall of case 1.

Piston 6 is energized by liquid supplied to cylinder 7 by a gear pump 8 which draws liquid from a reservoir 9 and discharges it into a supply channel 10 one branch of which is connected to cylinder 7. The liquid discharged by pump 8 in excess of requirements is exhausted through a relief valve 11 which enables pump 8 to maintain a constant pressure in channel 10.

Pump 8 and reservoir 9 have been shown separate from pump P1 but actually pump 8 is driven in unison with pump P1 and is arranged within its case 1 and reservoir 9 constitutes a base upon which pump P1 is mounted which is according to common practice. A part of the liquid discharged by pump 8 is usually employed for other purposes but connections to pump 8 for such purposes has not been shown as they form no part of the present invention.

Slide block 3 is adapted to be moved toward the right by a piston 15 which forms a part of the present invention and is fitted in a cylinder 16 carried by the left wall of case 1 and closed at its outer end by a cylinder head 17. Piston 15 has a pressure area approximately twice that of piston 6 so that, when liquid is supplied to cylinder 16 from pump 8, piston 15 will move slide block 3 toward the right against the force exerted thereon by piston 6. When cylinder 16 is connected to exhaust, piston 6 will move slide block 3 toward the left. When flow of liquid into or out of cylinder 16 ceases, slide block 3 will be held stationary by pistons 6 and 15.

When pump P1 is creating a high pressure, the forces created in the pump by the pressure cause slide block 3 to move downward when the pump is discharging liquid in one direction and to move upward when the pump is discharging liquid in the opposite direction. Also, more friction at one corner of slide block 3 than at the other corners thereof sometimes causes slide block 3 to tilt. Vertical movements of slide block 3 is permitted by the very slight clearance between slide plates 4 and 5 and probably by some deflection of the parts. The vertical and tilting movements are very slight but, in a pump provided with a prior control of the type to which the present invention relates, the movements transmitted from the slide block to the piston corresponding to piston 15 are sufficient to cause binding or cramping of the valve which controls the flow of liquid into and out of the cylinder corresponding to cylinder 16.

Figure 2:
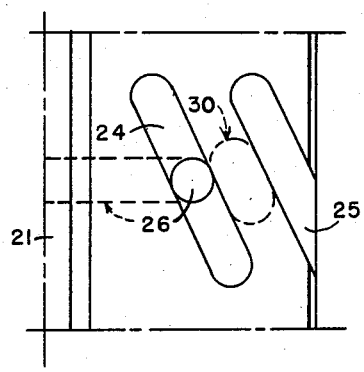
Fig. 2 is a developed top plan view of a portion of the valve shown in Fig. 1.
Figure 1:
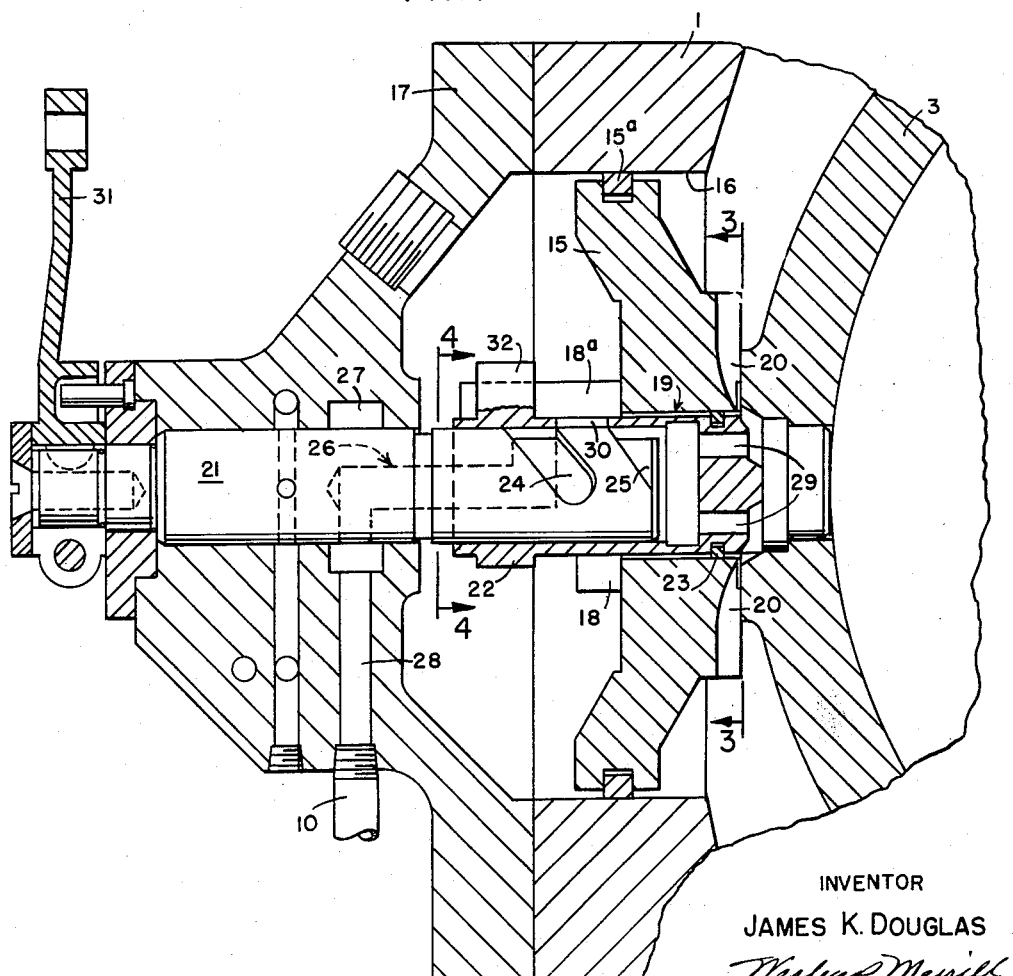
Fig. 1 is a central vertical section through a control in which the invention is embodied.
Figure 3:
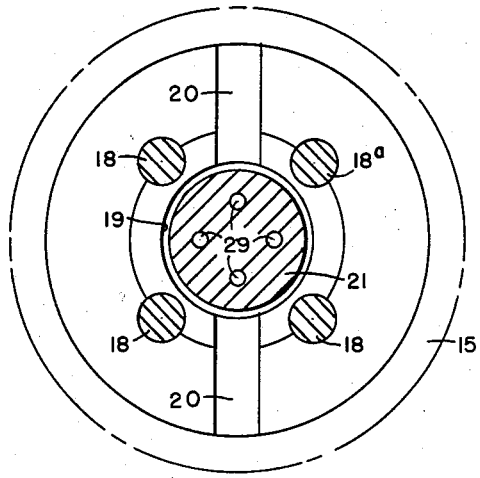
Fig. 3 is a transverse vertical section taken on the line 3—3 of Fig. 1.
Figure 4:
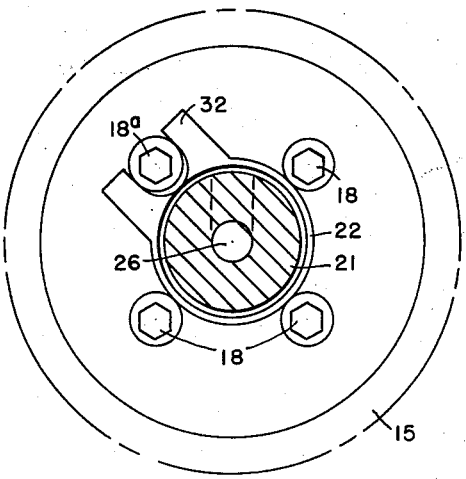
Fig. 4 is a transverse vertical section taken on the line 4—4 of Fig. 1.

As shown in Fig. 1, piston 15 is provided with a piston ring 15a which forms a substantially liquid tight seal between the periphery of the piston and the wall of cylinder 16, it is fixed to slide block 3 by three bolts 18 and one bolt 18a (Figs. 3 and 4), and the piston proper is enough smaller than cylinder 16 to provide between its periphery and the wall of cylinder 16 a clearance of about .03" so that piston 15 can be moved radially and be tilted by corresponding movements of slide block 3.

Piston 15 has an axial bore 19 extending therethrough and two drain grooves 20 formed in its inner face and extending radially outward from bore 19. Flow of liquid into and out of cylinder 16 is controlled by a follow-up type valve comprising a cylindrical valve member or valve 21, which is closely fitted in and supported by cylinder head 17, and a cylindrical valve body 22 which is closely fitted upon and supported by valve 21 and extends through bore 19 into engagement with slide block 3. Valve body 22 is enough smaller in diameter than bore 19 to permit piston 15 to move radially or to tilt, as explained above, without moving valve body 22 and a piston ring 23 is arranged in the peripheral surface of valve body 22 to provide a substantially liquid tight seal between valve body 22 and the wall of bore 19. The arrangement is such that pressure in cylinder 16 acts upon valve body 22 and holds it in contact with slide block 3.

Valve 21 has formed in its peripheral surface a pressure groove 24, which is continuously supplied with liquid under pressure, and an exhaust groove 25 which is spaced from groove 24 and is connected to exhaust. As shown, valve 21 has a passage 26 formed in the interior thereof and connecting groove 24 to a port 27 which is formed in cylinder head 17 around valve 21. Port 27 communicates with a passage 28 which is formed in cylinder head 17 and has a branch of gear pump supply channel 10 connected thereto so that gear pump pressure extends at all times into groove 24. Exhaust groove 25 extends to the end of the valve 21 and valve body 22 has four holes 29 extending through the end wall thereof so that liquid entering groove 25 can flow therefrom through holes 29 and drain groove 20 into the interior of case 1.

Valve body 22 has a port 30 extending through its side wall with the opposite edges thereof in alignment with the adjacent edges of grooves 24 and 25, respectively, so that a slight movement of valve 21 in one direction or the other will open groove 24 or 25 to port 30 and thereby either will permit liquid to flow into cylinder 16 and cause piston 15 to move slide block 3 toward the right or will permit the liquid to escape from cylinder 16 and enable piston 6 to move slide block 3 and piston 15 toward the left. Valve body 22 will move with slide block 3 and will cut off flow of liquid into or out of cylinder 16 substantially as soon as movement of valve 21 ceases.

In controls of this general type, the control valve corresponding to valve 21 is sometimes axially movable to selectively connect the pressure and exhaust grooves to the control cylinder but, since a small movement of the pump slide block results in a large variation in pump displacement and since movement of the valve axially through a given distance results in movement of the slide block through the same distance, a rotary valve is preferably employed.

As shown, valve member 21 is journaled for rotation in end head 17 and is radially rigid with respect to end head 17. In valve member 21 grooves 24 and 25 extend spirally around valve 21 through predetermined angular distances and valve 21 is adapted to be rotated by a lever 31 which is fixed on the outer end thereof and also prevents axial movement of valve 21. In order to prevent rotation of valve body 22, the head of bolt 18a is elongated and arranged within a bifurcated lug 32 which is formed integral with valve body 22. The bifurcated lug 32 and the bolt 18a define means which secures the valve body in non-rotatable relation to the piston 15 without restraining radial deflection or tilting movements of the piston 15 relative to the radially fixed valve body.

From the foregoing, it will be obvious that the clearance between the periphery of piston 15 and the wall of cylinder 16 permits piston 15 to be moved radially and to be tilted by slide block 3 and that the clearance between valve body 22 and the wall of bore 19 prevents any movement of piston 15 from being transmitted to valve body 22 nor through valve body 22 to valve 21 so that valve 21 is never caused to bind either in valve body 22 or in cylinder head 17. Consequently, the control can at all times be readily and easily adjusted regardless of the greatest movements of the slide block in a properly constructed pump.

The control described herein may be modified in various ways and be employed to control different types of hydrodynamic machines without departing from the scope of the invention which is hereby claimed as follows:

1. A control for a hydrodynamic machine having a case, a displacement varying member slideably fitted in said case, means for continuously urging said member in a given direction transversely of said case, and a source of pressure liquid, said control comprising a cylinder carried by said case, a cylinder head closing the outer end of said cylinder, a piston loosely fitted in said cylinder and having an axial bore extending therethrough, means fastening said piston to said member to cause said piston to move radially or to tilt in response to corresponding movements of said member, a piston ring arranged in said piston and forming a substantially liquid tight seal between said piston and the wall of said cylinder, and means for directing liquid from said source to said cylinder to enable said piston to move said member in one direction against the force exerted by said urging means and for directing liquid from said cylinder to exhaust to permit said urging measn to move said member in the opposite direction, said liquid directing means including a valve member having one end journaled in said head and being substantially rigid radially therewith, the other end of said valve member journaled in a closely fitted valve body that extends through said bore in said piston in radially spaced relation therewith so that said relatively radially rigid valve member and valve body do not restrain said radial or tilting movements of said piston, and resilient means disposed between said valve body and the wall of said bore to maintain said valve body and said piston in substantially liquid tight relation.

2. A control for a hydrodynamic machine as described in claim 1 in which said resilient means disposed between said valve body and the wall of said bore of said piston comprises a piston ring and said valve body being constructed and arranged so that any pressure in said cylinder urges said valve body axially of said bore and against said displacement varying member.

3. A control for a hydrodynamic machine as described in claim 1 in which said valve member is rotatable relative to said valve body and including means securing said valve body in non-rotatable relation to said piston while permitting said relative radial and tilting movement therebetween.

References Cited in the file of this patent

UNITED STATES PATENTS

| | | |
|---|---|---|
| 1,822,667 | Proell | Sept. 8, 1931 |
| 1,961,886 | Larger | June 5, 1934 |
| 2,068,859 | Jones et al. | Jan. 26, 1937 |
| 2,198,129 | Sanford et al. | Apr. 23, 1940 |
| 2,324,750 | Wiedmann | July 20, 1943 |
| 2,571,658 | Bennett | Oct. 16, 1951 |
| 2,604,076 | Trevaskis | July 22, 1952 |